United States Patent [19]

Asakuma et al.

[11] 4,265,297
[45] May 5, 1981

[54] APPARATUS FOR DETACHABLY MOUNTING MOLDS

[75] Inventors: Kazutaka Asakuma, Zama; Tsuyoshi Kikuchi, Atsugi, both of Japan

[73] Assignee: Toshiba Kikai Kabushiki Kaisha, Tokyo, Japan

[21] Appl. No.: 127,751

[22] Filed: Mar. 6, 1980

[30] Foreign Application Priority Data

Mar. 9, 1979 [JP] Japan .................................. 54/26726

[51] Int. Cl.³ ............................................. B22D 17/22
[52] U.S. Cl. ................................. 164/303; 164/343; 425/450.1
[58] Field of Search .................. 164/303, 342, 343; 248/500, 510; 425/450.1

[56] References Cited

U.S. PATENT DOCUMENTS

| | | | |
|---|---|---|---|
| 2,485,283 | 10/1949 | Guelph | 425/450.1 X |
| 2,754,558 | 7/1956 | Glock | 164/343 X |
| 3,199,159 | 8/1965 | Wernecke | 164/343 X |
| 3,242,249 | 3/1966 | Nouel | 425/450.1 X |
| 4,020,894 | 5/1977 | McCoy et al. | 164/343 |

*Primary Examiner*—Robert D. Baldwin
*Attorney, Agent, or Firm*—Koda and Androlia

[57] ABSTRACT

Apparatus for detachably mounting molds on die plates of, for example, a die casting machine, which comprises a casing slidable on the die plate, a wedge member located within the casing and in contact with the inner surface thereof and a clamp lever located in the casing to be rotatable about a shaft attached to the casing and in contact with the inclined surface of the wedge member at one end. A clamping member to clamp a mold half in the die plate is provided for the other end of the clamp lever. The wedge member and the casing are moved by a hydraulic drive engaged with the wedge and there is provided a member for resiliently urging the one end of the clamp lever against the inclined surface of the wedge member.

7 Claims, 7 Drawing Figures

APPARATUS FOR DETACHABLY MOUNTING MOLDS

BACKGROUND OF THE INVENTION

This invention relates to apparatus for rapidly and accurately attaching and detaching stationary and movable mold halves to and from stationary and movable die plates, respectively, of a die casting machine, a plastic injection molding machine, or a press machine.

According to a known method, the stationary and movable mold halves have been attached to the stationary and movable die plates by using a crane or a hoist in such a manner that the mold halves lifted by the crane are lowered between the stationary and movable die plates so that the center of a sleeve of each mold half aligns with substantially the central portion of the width of the injection molding machine and the position of the lifted and lowered mold half is determined by finely adjusting the height of the crane. After the center of the sleeve of the stationary or movable mold half has been made to coincide with the center of a plunger sleeve of the stationary or movable die plate of the injection molding machine, the mold half is manually pushed into the plunger sleeve and the mold half is then clamped to the die plate by using well known mold clamping means.

The detachment of the stationary or movable mold half from the stationary or movable die plate has been performed by the steps of combining the stationary and movable mold halves, lifting the combined mold halves by using the crane or hoist, removing the mold clamping means to separate both mold halves, and manually removing the stationary and movable mold halves from the plunger sleeves of the respective die plate. The mold halves are carried to the outside of the injection molding machine by using the crane.

In the mold attaching or detaching method described above, the mold halves are manually pushed into the plunger sleeves of the die plates and drawn off therefrom by workmen, and the mold clamping means has to be also manually adjusted. Such manual works require much time and labor for workmen, even if they are experts in the field. Particularly, in a large injection molding machine, it is a serious problem to eliminate workmen's labor and reduce their working time.

Moreover, since mold halves having various sizes are to be used for an injection molding machine depending upon the size and shape of products to be molded and the number of the products, the apparatus for detachably mounting the mold halves are required to be provided with a follow-up mechanism for the mold halves so as to attach or detach the mold halves of different size to or from a stationary and movable die plates. In the prior art, in order to solve this problem there has been proposed a method wherein the apparatus for detachably mounting the mold halves is disposed between the stationary and movable die plates with the apparatus fully opened to ensure a space for accommodating mold halves having various sizes when the mold halves are attached to the stationary and movable die plates. In this state, the apparatus clamps the mold halves and then the apparatus is moved to a position where the mold halves are clamped thereby to attach the mold halves to the stationary and movable die plates, respectively. When it is required to detach the mold halves from the stationary and movable die plates, the mold clamping means are released and the mold attaching-detaching apparatus are backwardly moved with the apparatus fully opened, thus detaching the mold halves from the respective die plates. In addition, it is required for the apparatus to maintain mold clamping force even in a case where a drive mechanism of the clamping means is stopped so as not to cause to fall down the mold halves secured to the stationary and movable die plate. However, for this purpose, the prior art mold attaching-detaching apparatus is provided independently with a drive mechanism for carrying out follow-up operation of the mold halves and a drive mechanism for clamping the mold halves. Such apparatus not only complicates the construction thereof but also occupies considerably wide space for attachment.

SUMMARY OF THE INVENTION

Accordingly, an object of this invention is to provide apparatus for detachably mounting molds for use in, for example, a die casting machine for mechanically carrying out mold attaching or detaching operation in a short time.

Another object of this invention is to provide apparatus for detachably mounting molds capable of smoothly operating in accordance with the size of the mold half and maintaining suitable clamping force in a case where a drive source of the apparatus is stopped.

According to this invention there is provided apparatus for detachably mounting molds on die plates of, for example, a die casting machine which comprises a casing slidable on the die plate, a wedge member located within the casing and in contact with the inner surface thereof, a clamp lever located in the casing to be rotatable about a shaft attached to the casing, the clamp lever having one end in contact with an inclined surface of the wedge member and the other end provided with a clamping member to clamp the mold half positioned in the die plate, a hydraulic drive in engagement with the wedge member to reciprocate the wedge member together with the casing, and a member for resiliently urging the one end of the clamp lever against the inclined surface of the wedge member.

As the resiliently urging member described above, compression plate springs, a hook member or a compression coil spring may be used.

DESCRIPTION OF THE PREFERRED EMBODIMENTS

Figure 1:
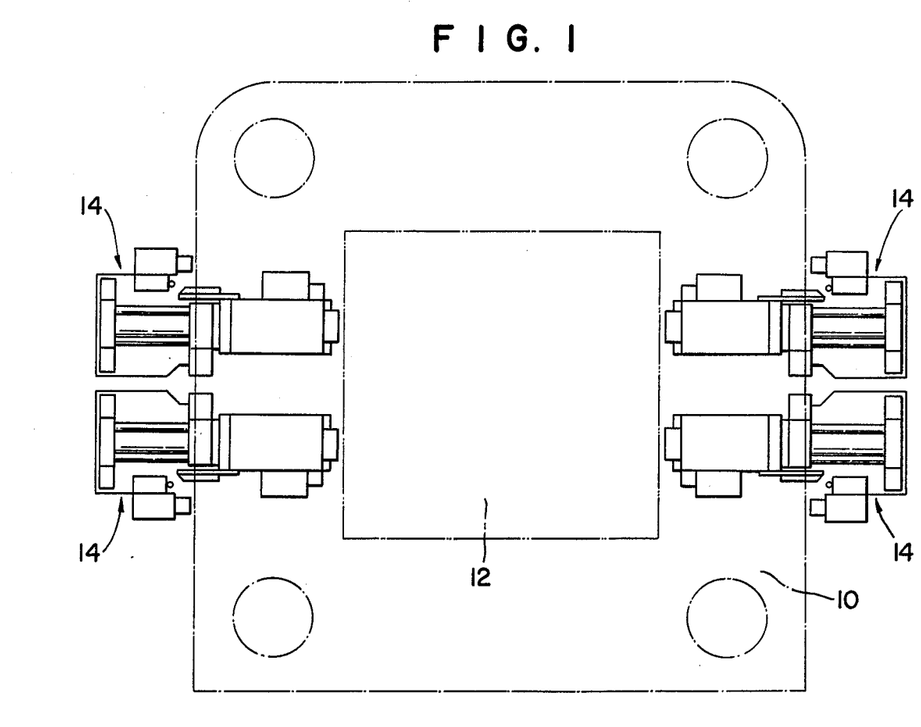
FIG. 1 is a schematic view showing a plurality of apparatus for detachably mounting molds according to this invention attached to movable and stationary die paltes.

Referring to FIG. 1, a plurality of apparatus for detachably mounting molds 14 are secured to a stationary or movable die plate 10 (hereinafter called merely a die plate) on both sides thereof, and in FIG. 1, a pair of apparatus 14 are provided on each side so as to interpose a stationary or movable mold half 12 (hereinafter called merely a mold half).

Figure 2:
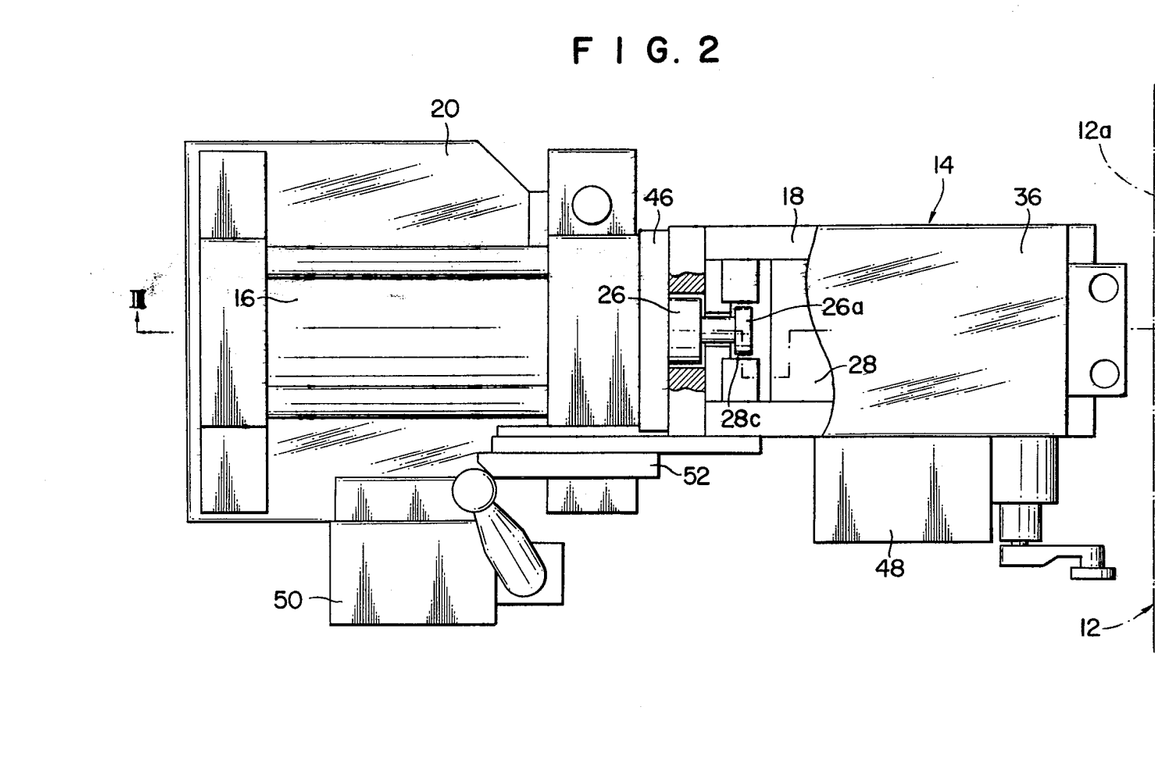
FIG. 2 is a plan view showing one embodiment of the apparatus according to this invention.
Figure 3:
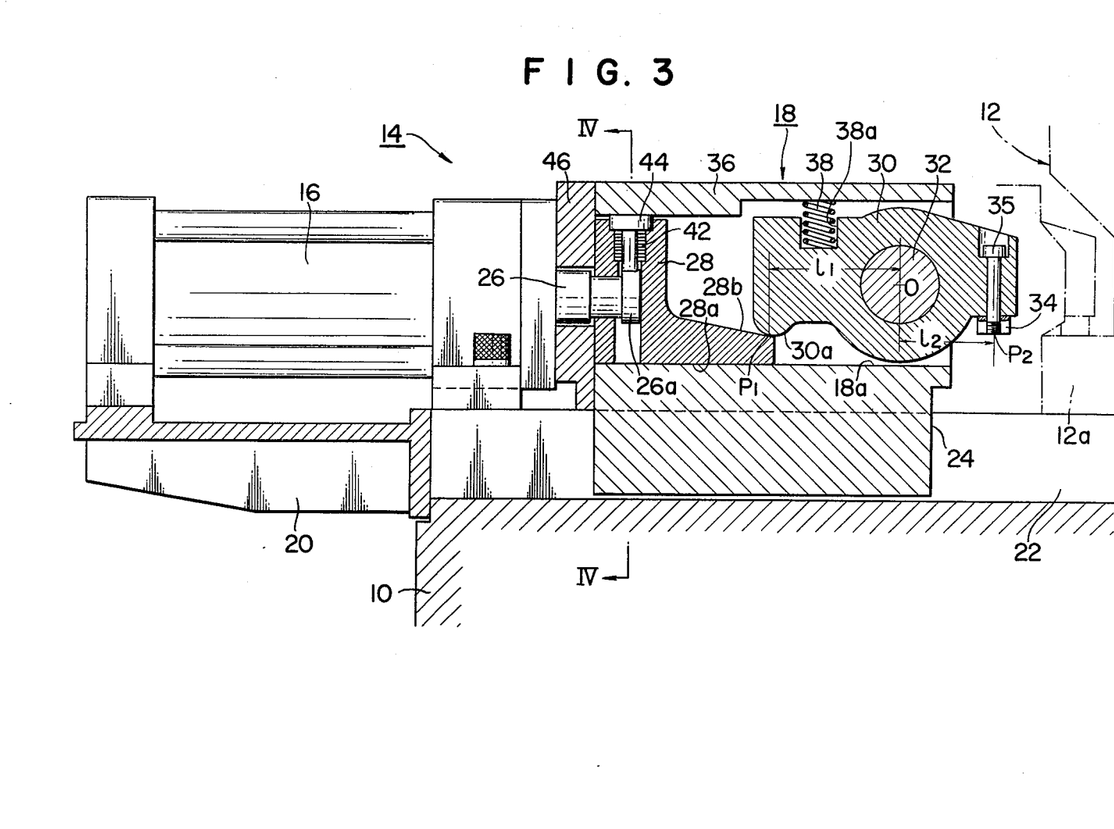
FIG. 3 shows a cross-sectional view of the apparatus taken along the line III—III shown in FIG. 2.
Figure 4:
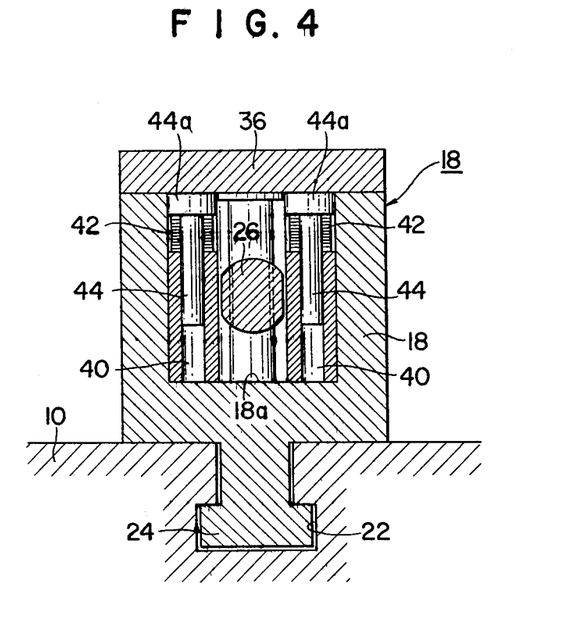
FIG. 4 shows a cross-sectional view taken along the line IV—IV shown in FIG. 3.

FIGS. 2 through 4 represent one embodiment of the apparatus for attaching or detaching the mold half 12 to or from the die plate 10. Each apparatus comprises a hydraulic piston-cylinder assembly 16 attached to the die plate 10 through a bracket 20 and a casing 18 driven by the assembly 16 so as to enable it to move forwardly and backwardly. The casing 18 is provided with a projection 24 which slidably engages with a T-shaped guide groove 22 formed in the die plate 10 so that the projection moves along the T-shaped groove 22 when the casing 18 is moved. A wedge member 28 is disposed within the casing 18 and one end of the wedge 28 is secured to the piston rod 26 of the hydraulic piston-cylinder assembly 16 as shown in FIG. 3 in such a manner that the bottom surface 28a of the wedge 28 slidably contacts with the inner bottom surface 18a of the casing 18 and the upper surface 28b is inclined with respect to the horizontal. The connection between the piston rod 26 and the wedge 28 is provided by engaging a flanged portion 26a formed on the front end of the piston rod 26 with a groove 28c (FIG. 2) formed at one end of the wedge 28.

A clamp lever 30 is also located in the casing 18 and journaled by a shaft 32 fixed to the casing 18. The clamp lever 30 is provided with, at its one end, a round surface 30a which contacts with the inclined surface 28b of the wedge member 28 and at the other end of the clamp lever 30 is attached a clamping member 34 for firmly clamping the mold half 12. Preferably, the clamping member 34 is detachably attached to the end portion of the clamp lever 30 by means of a bolt 35 as shown in FIG. 3 so as to permit easy exchange of the clamping member 34 with another one depending upon the shape of the mold half 12 to be used. A compression coil spring 38 is interposed between the inside surface of a cover 36 of the casing 18 and a recess 38b formed in the clamp lever 30 as shown in FIG. 3 so that the inclined surface 30a of the lever 30 firmly engages the inclined surface 28b of the wedge 28 when the wedge is moved forwardly and that the clamp lever 30 easily returns to the original position (to the position shown in FIG. 3) when the wedge 28 is moved backwardly (leftwardly) and the clamp lever 30 counterclockwisely rotates about the shaft 32. A plurality of compression coil springs may be disposed as occasion demands to increase the compressive spring force.

In order to properly maintain a predetermined frictional force between the wedge 28 and the casing 18, a plurality of plate springs 42 can be slidably mounted on pins 44 received in vertical holes 40 in the wedge 28 as shown in FIG. 4. Each pin 44 is provided with a square head 44a so as to prevent the wedge from rotating and the head 44a of the pin 44 abuts against the inner surface of the cover 36 thereby to urge downwardly the wedge 28 through the plate springs 42 to engage the wedge 28 with the inner bottom surface 18a of the casing 18. In this manner, frictional force is generated at the surface 28a of the wedge and at the contacting surface between the square head of the pin 44 and the inner surface of the cover 36. In the embodiment illustrated in FIGS. 2 through 4, it will be necessary to preliminarily adjust the spring force of the plate springs 42 so that this frictional force does not exceed the sliding resistance of the casing 18 against the wall surface of the T-shaped groove 22 so as to forwardly (rightwardly as viewed in FIG. 3) move the wedge 28 together with the casing 18 by the actuation of the hydraulic piston-cylinder assembly 16. When the front end of the casing 18 abuts against the mold half 12, the movement of the casing 18 stops and only the wedge 28 moves forwardly because the pushing force of the piston-cylinder assembly 16 exceeds the frictional force caused by the plate springs 42 at the sliding surface 28a of the wedge 28. The adjustment of the plate springs 42 may be achieved by changing the number of the plate springs or the thickness of the square head 44a of the pin 44 or of the cover 36.

Reference numeral 46 (FIG. 2 or 3) designates a stop member secured to the rear end of the casing 18 for limiting the backward movement of the wedge 28 and numerals 48 and 50 in FIG. 2 designate suitable limit switches mounted on the outer surface of the apparatus, in which the limit switch 48 detects the fact that the casing 18 abuts against the mold half 12 and the limit switch 50 detects the fact that the casing 18 returns to the limit position of the backward movement when the casing 18 abuts against a dog 52 secured to the bottom surface of the rear end of the casing 18.

The mold attaching-detaching apparatus shown in FIGS. 2 through 4 operates as follows:

When the hydraulic piston-cylinder assembly 16 is operated to clamp the mold half 12 to the die plate 10, the casing 18 is moved forwardly together with the wedge 28 because the frictional force between the casing 18 and the wedge 28 exceeds the sliding resistance between the casing 18 and the die plate 10. When the end surface of the casing 18 abuts against the mold half 12, the casing 18 stops and thereafter, only the wedge 28 advances since the pushing force due to the operation of the piston-cylinder assembly 16 exceeds the frictional force at the sliding surface 28a of the wedge 28. On the way of the forward movement of the wedge 28, the inclined surface 28b thereof engages the round side surface 30a of the clamp lever 30 thereby to clockwisely rotate the clamp lever 30 about the shaft 32 so as to lower the clamping member 34 attached to the end portion of the lever 30 to a position for firmly clamping the mold half 12. During this clamping operation the wedge 28 provides a self-locking mechanism because of its inclined engaging surface 28b and therefore, even in a case where the operation of the piston-cylinder assembly 16 is stopped after the mold half 12 has been clamped by the clamp lever 30, the mold half 12 remains clamped.

In addition, as shown in FIG. 3, the distance $l_1$ between the center O of the shaft 32 and the contacting point $P_1$ of the clamp lever 30 and the wedge 28 is designed to be longer than the distance $l_2$ between the center O of the shaft 32 and the contacting Point $P_2$ of the clamping member 34 and the mold half 12 to be clamped, so that the clockwise rotating force of the clamp lever 30 caused by the advance of the wedge 28, i.e. the force to clamp the mold half, is increased by the principle of a lever. Thus, clamping force of few tons/cm$^2$ is applied to the clamp portion 12a of the mold half 12 by the clamping member 34.

The clamping force can be released as follows.

When the hydraulic piston-cylinder assembly 16 is operated to bring back (leftwardly as viewed in FIG. 3) the wedge 28, the clamp lever 30 rotates counterclockwisely about the shaft 32. This counterclockwise rotation of the clamp lever 30 gradually reduces the clamping force of the clamping member 34, and when the clamping force finally reaches zero value, the resultant force of the sliding resistance between the casing 18 and the die plate 10 and the frictional force caused at the contacting point $P_2$ become less than the frictional force due to the plate spring 42 between the casing 18 and the wedge 28 thereby to bring back the wedge 28 together with the casing 18 to a position at which the stop member 46 will abut against the piston-cylinder assembly 16. After the casing 18 has reached its limit of backward movement, only the wedge 28 moves backwardly to a position at which it will abut against the stop member 46 and at the same time the clamp lever 30 is rotated counterclockwisely about the shaft 32 by the spring force of the compression coil spring 38 thereby to release the clamping force from the clamp portion 12a of the mold half 12.

With the embodiment of the apparatus described above, the casing 18 and the wedge 28 are first moved and only the wedge is then moved forwardly to clamp the mold half 12 by the operation of the piston-cylinder assembly 16, so that there may happen a case where the casing 18 will stop before it actually abuts against the mold half 12 because of an abnormally large resistance caused against the casing 18. However, such abnormal phenomenon is detected by the limit switch 48 which detects the fact that the casing 18 has reached the mold half 12. The confirmation of the backward movement of the casing 18 can be performed by the other limit switch 50.

Figure 5:
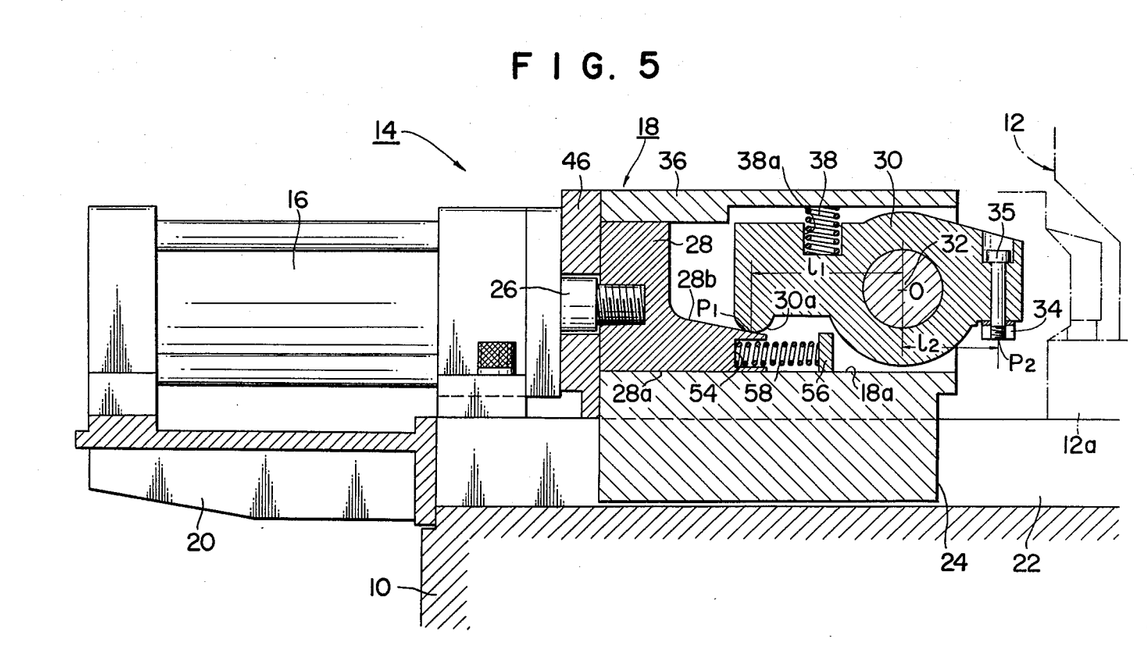
FIG. 5 shows a front view, partially in cross-section, of another embodiment of the apparatus according to this invention.

FIG. 5 represents another embodiment of the apparatus for detachably mounting molds according to this invention, in which like reference numerals are applied to the elements corresponding to those shown in FIGS. 2 through 4. In this embodiment, instead of using the combination of the plate springs 42 and the pins 44, there is used an assembly for maintaining the wedge 28 in contact with the casing 18 under a predetermined frictional pressure. This assembly comprises a compression coil spring 58 interposed between a member 56 secured to the inner surface 18a of the casing 18 and a recess 54 formed on one end of the wedge 28 as shown in FIG. 5. The coil spring 58 is designed to have a urging force which is larger than the sliding resistance of the casing 18 toward the die plate 10 and less than the pushing force of the piston-cylinder assembly 16.

According to the modified embodiment shown in FIG. 5, when the piston-cylinder assembly 16 is operated, the force of the compression coil spring 58 is larger than the sliding resistance of the casing 18 toward the die plate 10, so that the casing 18 is first moved forwardly together with the wedge 28 and only the wedge advances after the front end of the casing 18 has reached the mold half 12 because the pushing force of the piston-cylinder assembly 16 exceeds the spring force, and the mold half 12 is clamped by the clamping member 34 of the clamp lever 30.

To release this clamping force, the piston-cylinder assembly 16 is actuated so as to bring back the wedge 28 thereby to counterclockwisely rotate the clamp lever 30 about the shaft 32 under the downward urging force of the coil spring 38. Thus, the clamping force due to the clamping member 34 is gradually reduced, and the wedge 28 is further brought back until it abuts against the stop member 46 by the actuation of the assembly 16 and the force of the coil spring 58. Thereafter, the wedge 28 is still further brought back together with the casing 18. Thus, the mold half 12 is released from the clamping member 34.

Figure 6:
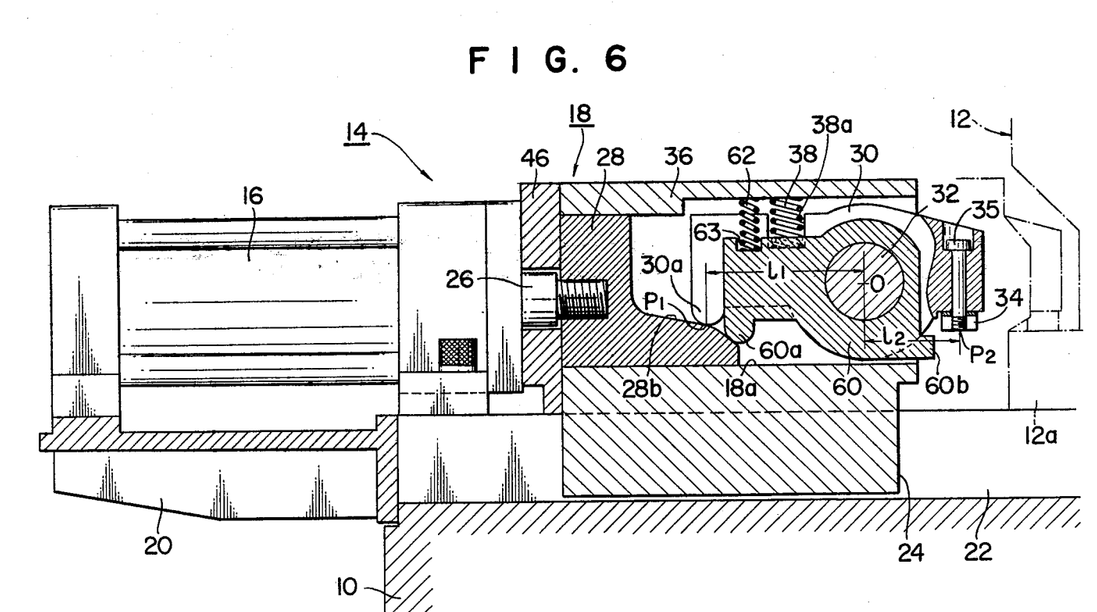
FIG. 6 shows a front view, partially in cross-section, of still another embodiment of the apparatus according to this invention.
Figure 7:
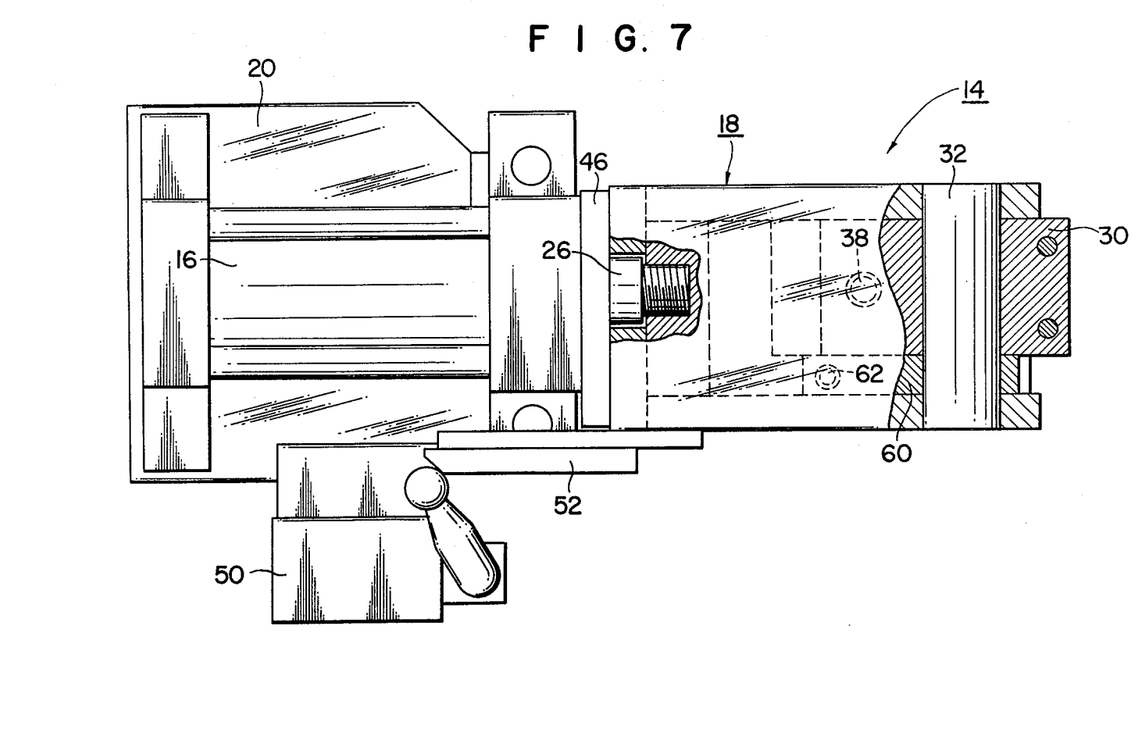
FIG. 7 shows a plan view of the apparatus shown in FIG. 6.

FIGS. 6 and 7 show still another embodiment of the apparatus according to this invention, in which the same reference numerals are applied to elements corresponding to those shown in FIGS. 1 through 5. With this embodiment, a hook like member 60 (called a hook hereinbelow) is mounted on the shaft 32 adjacent and coaxially with the clamp lever 30. The hook 60 is provided with one protruded side end 60a (lefthand end as viewed in FIG. 6) which engages the front end of the inclined surface 28b of the wedge member 28 and the other end 60b which abuts against the clamp portion 12a of the mold half 12 when the casing advances. A compression coil spring 62 is interposed between the inner surface of the cover 36 of the casing 18 and a recess 63 formed in the hook 60 so that the hook is always biased to rotate counterclockwisely about the shaft 32.

This embodiment operates as follows. When the hydraulic piston-cylinder assembly 16 operates, the casing 18 is forwardly moved together with the wedge 28 because the contact force between the front end of the inclined surface 28b of the wedge 28 and the protruded end 60a of the hook 60 is larger than the sliding resistance of the casing 18 against the die plate 10. When the other end 60b of the hook 60 abuts against the clamp portion 12a of the mold half 12, the hook stops. Thereafter, the pushing force of the piston-cylinder assembly 16 exceeds contact force between the hook 60 and the wedge 28, whereby only the wedge 28 advances. As a result, the end portion 60a slides on the inclined surface 28b of the wedge 28, so that the hook 60 is rotated clockwisely about the shaft 32, and at the same time, since one end 30a of the clamp lever 30 also engages the surface 28b, the clamp lever 30 is also rotated clockwisely about the shaft 32, thus clamping the mold half 12 at the other end of the clamp lever 30. Therefore, in this embodiment, the limit switch 48 can be eliminated.

To release the clamping force, the hydraulic piston-cylinder assembly 16 is operated to bring back the wedge 28, and as the wedge 28 is brought back, the clamp lever 30 rotates counterclockwisely under the force of the compression coil spring 38 because the end 30a slides along the inclined surface 28a of the wedge 28. The clamping force of the clamping member 34 acting on the clamp portion of the mold half 12 is gradually reduced and finally becomes zero. During an interval in which the wedge 28 is brought back to a position at which the wedge abuts against the stop member 46, the hook 60 is also rotated counterclockwisely about the shaft 32 by the force of the coil spring 62 and returns to the position shown in FIG. 6. Then, the casing 18 is backwardly moved together with the wedge 28 until the casing abuts against the piston-cylinder assembly 16 by the operation thereof. The mold half 12 is completely released from the clamping member 34.

In the foregoing disclosures, although there is referred to the operation of only one apparatus for attaching or detaching a mold half to and from a die plate, it will of course be understood by those skilled in the art that substantially the same operation can be done with the other apparatus located on the sides of the movable and stationary die plates. In addition, regarding the embodiments illustrated in FIGS. 5 and 6, it will be apparent that the distance $l_1$ is predetermined to be larger than the distance $l_2$, in which $l_1$ and $l_2$ are the distances connecting the points $P_1$ and $P_2$ as has been described with reference to the embodiment shown in FIG. 3.

As is apparent from the embodiment disclosed hereinabove, according to this invention, mold clamping and releasing operations are performed by using a single drive source, i.e. a hydraulic piston-cylinder assembly, so that the mold attaching-detaching apparatus can be made to be compact and it is not necessary to provide specific means for the die plate to guide the movement of the mold half. Thus, the die plate can be made compact and the apparatus can be manufactured at a lower cost than the prior art device.

In addition, due to the self-locking mechanism including the clamp lever and the hook member, the clamp force of the clamp lever can be maintained after it has clamped the mold half even if the actuation of the piston-cylinder assembly stops, thereby preventing the mold half from falling down and thus ensuring safe die casting work or pressing work.

While the invention has been described with reference to preferred embodiments thereof, it will be understood by those skilled in the art that many modifications and changes can be made within the spirit and scope of the present invention as defined in the appended claims.

We claim:

1. Apparatus for detachably mounting mold halves on a die casting machine comprising a casing slidable on a die plate of the die casting machine, a wedge member located within said casing and in slidable contact with the inner surface thereof, the contact frictional force between the wedge member and said inner surface being larger than the sliding resistance between said die plate and the outer surface of said casing, a clamp lever located in said casing to be rotatable about a shaft attached to said casing, said clamp lever having one end in contact with an inclined surface of said wedge member and the other end provided with a clamping member to clamp said mold half positioned in said die plate, hydraulic drive means in engagement with said wedge member to reciprocate said wedge member together with said casing and to reciprocate said wedge member relative to said casing, and means for resiliently urging said one end of said clamp lever agaisnt the inclined surface of said wedge member.

2. The apparatus according to claim 1 which further comprises means for urging said wedge member against the inner surace of said casing with a predetermined contact frictional force.

3. The apparatus according to claim 1 wherein said resiliently urging means comprises a coil spring which is interposed between the inner surface of said casing and a recess provided for said clamp lever.

4. The apparatus according to claim 1 wherein said resiliently urging means comprises a plurality of plate springs interposed between the inner surface of said casing and said wedge member and pins extending through said plate springs so as to downwardly urge said wedge member.

5. The apparatus according to claim 1 wherein said resiliently urging means comprises a member mounted on an inner bottom surface of said casing and a compression coil spring with one end fixed to said member and the other end housed in a recess formed on the front end portion of said wedge member.

6. The apparatus according to claim 1 wherein said resiliently urging means comprises a hook-like member rotatably mounted on said shaft coaxially with and adjacent said clamp lever and a compression spring interposed between the inner surface of said casing and a recess provided for said hook member so as to urge one end of said hook member against the inclined surface of said wedge member.

7. The apparatus according to clam 1 wherein a distance between the center of said shaft and a contacting point between one end of said clamp lever and the inclined surface of said wedge member is predetermined to be larger than a distance between the center of the shaft and a contacting point between said clamping member and the clamp portion of the mold half to be clamped.

* * * * *